United States Patent [19]
Bauch

[11] 3,802,494
[45] Apr. 9, 1974

[54] APPARATUS FOR STRETCHING EXTENSIBLE MATERIALS

[75] Inventor: Ernst Bauch, Bordesholm, Germany

[73] Assignee: Neumunstersche Maschinen- und Apparatebau Gesellschaft m.b.H., Neumunster, Germany

[22] Filed: Nov. 19, 1971

[21] Appl. No.: 200,491

Related U.S. Application Data
[63] Continuation-in-part of Ser. No. 199,124, Nov. 16, 1971.

[30] Foreign Application Priority Data
Nov. 7, 1971  Germany.............................. 2100567

[52] U.S. Cl. .............................................. 165/89
[51] Int. Cl. ............................................. F28g 5/02
[58] Field of Search ............................... 165/86–90, 165/91; 62/499; 34/108; 415/122 A; 74/665 M

[56] References Cited
UNITED STATES PATENTS

| | | | |
|---|---|---|---|
| 2,470,794 | 5/1949 | Snyder | 415/122 A |
| 3,302,698 | 2/1967 | Edwards | 165/89 |
| 3,397,739 | 8/1968 | Miller | 165/86 |
| 3,704,669 | 12/1972 | Christoff | 165/90 |

Primary Examiner—Charles J. Myhre
Assistant Examiner—Theophil W. Streule, Jr.
Attorney, Agent, or Firm—Michael S. Striker

[57] ABSTRACT

A single stationary shaft has spaced endportions and an intermediate portion, with the latter being mounted in a frame or support. A pair of hollow rolls are provided, each surrounding one of the endportions and being journalled thereon for rotation. One or two drives are provided for driving each of the rolls individually in rotation.

10 Claims, 4 Drawing Figures

APPARATUS FOR STRETCHING EXTENSIBLE MATERIALS

RELATED APPLICATIONS

The present application is a continuation-in-part application of U.S. Pat. application Ser. No. 199,124, filed by applicant on Nov. 16, 1971 and entitled "HEATED ROLLER AND METHOD OF HEATING THE SAME".

BACKGROUND OF THE INVENTION

The present invention relates generally to the stretching of extensible materials, and more particularly to an apparatus for carrying out such stretching.

Many extensible materials are provided which must be stretched for various reasons. This includes for instance threads, yarns or the like, including those of synthetic plastic material; the category also includes foils, tapes, ribbons and the like including those of synthetic plastic material. The reasons for effecting such stretching are known, and by way of example it will suffice to point to the requirement for molecular orientation which is frequently made of such materials.

Apparatus is, of course, known for effecting such stretching. Generally speaking, such apparatus utilizes several heated and driven rollers, usually three, five or seven of them. Of course the forces which act on such rollers when the latter are employed for stretching the materials in question, are substantial and as a result of this the known apparatus for the most part uses rollers which are journalled at both axial ends. This, however, is disadvantageous from the point of view of applying the material to be stretched to the circumference of the roller, especially during starting-up of the operation, because this is made difficult by the fact that both axial ends of the rollers are obstructed by the journals and supports therefor. Apparatus utilizing rollers which are journalled at both axial ends therefore as a rule requires complicated and expensive devices for applying the material to be stretched to the roller circumference.

It is also known to provide apparatus for this purpose in which the heated rollers are journalled only at one axial end, that is the support on which they are mounted for rotation is provided only at this one axial end. However, experience has shown that due to the significant forces acting upon such rollers during the operation thereof, the possible axial length which can be given rollers which are journalled only at one axial end is so small as to make their utilization impractical under most circumstances. For this reason apparatus utilizing such rollers has never become widely used in the industry. An additional factor which has prevented the wide adoption of such apparatus is the fact that if the rollers are heated by means of a fluid circulated through them, it was difficult to supply and remove the heating fluid; as a rule the supply or removal had to take place at the free (unsupported) end of the roll and the means provided for this purpose of course then caused the small obstructions which in the other types of apparatus were caused by the journalling means, so that the difficulties of the type of apparatus utilizing rollers journalled at both ends either existed also in the rollers journalled only at one end, or were at most very slightly mitigated.

SUMMARY OF THE INVENTION

It is, accordingly, an object of the present invention to provide an improved apparatus of the type here under discussion which is not possessed of the disadvantages of the prior art.

More particularly it is an object of the present invention to provide such an improved apparatus in which the support for the rolls need be provided at only one axial end but the difficulties attendant to this type of mounting in the prior art have been avoided.

In pursuance of these and other objects which will become apparent hereafter, one feature of the invention resides in an apparatus of the character here described, which briefly stated comprises a single stationary shaft having spaced end portions and an intermediate portion. Mounting means is provided for said shaft engaging the intermediate portion thereof. A pair of hollow rolls are also provided, each surrounding one of the end portions and being journalled for rotation thereon, and drive means drives each of the rolls individually in rotation.

Of course, a stretching apparatus of the type here under discussion may utilize several of these shafts each provided with two of the rolls, and it is the essential feature that each such shaft have two of these rolls associated with it. Because during normal operation the forces which act upon the two rolls associated with each shaft are the same, and because the stationary shaft can be mounted much more simply and firmly in the machine frame or base than a rotating shaft, the difficulties heretofore encountered in mounting each roll only at one axial end have been overcome whereas the advantages of such mounting—particularly during start-up of operations—have been fully retained.

The rolls themselves can be heated in various different ways, for instance by means of electrical resistance heating devices. A more even heating effect is obtained, however, by circulating a heating fluid through the rolls, particularly in the manner disclosed in my related application filed on Nov. 16, 1971 and copending under Ser. No. 199,124. According to that application the heating fluid is utilized not only for heating purposes but for lubricating purposes at the same time, in order to lubricate with all or some of this heating fluid the bearings or journals of the respective rolls. This type of construction permits the otherwise existing difficulties in terms of sealing against escape of the heating fluid, to be solved in a particularly simple and advantageous manner.

To drive the rolls of the apparatus according to the present invention, each of the rolls is provided with a gear which in turn meshes with and is driven by a suitable drive, for instance with another gear which is driven by a worm drive. Two of these worm drives may be associated with each shaft, each acting upon one of the rollers and both being located either within or without the machine frame or support. If they are located without the support, this construction has the advantage that repair and inspections can be carried out more readily; on the other hand, locating the drives within the machine support results in a particularly space-saving and compact construction.

In some circumstances it is possible to provide only a single drive which drives both of the rolls associated with the shaft. This is the case if no conditions will arise which will require the two rolls mounted on the same shaft to be driven at differential speeds. In such a case the single drive is advantageously, but not necessarily, located within the machine support and may be coupled directly with both rolls or may be associated with the rolls by means of suitable couplings which then permit the drive to be selectively coupled with one or the other of the rolls or with both of them simultaneously. It is thus clear that the invention can be accommodated to an optimum extent to various different circumstances and conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
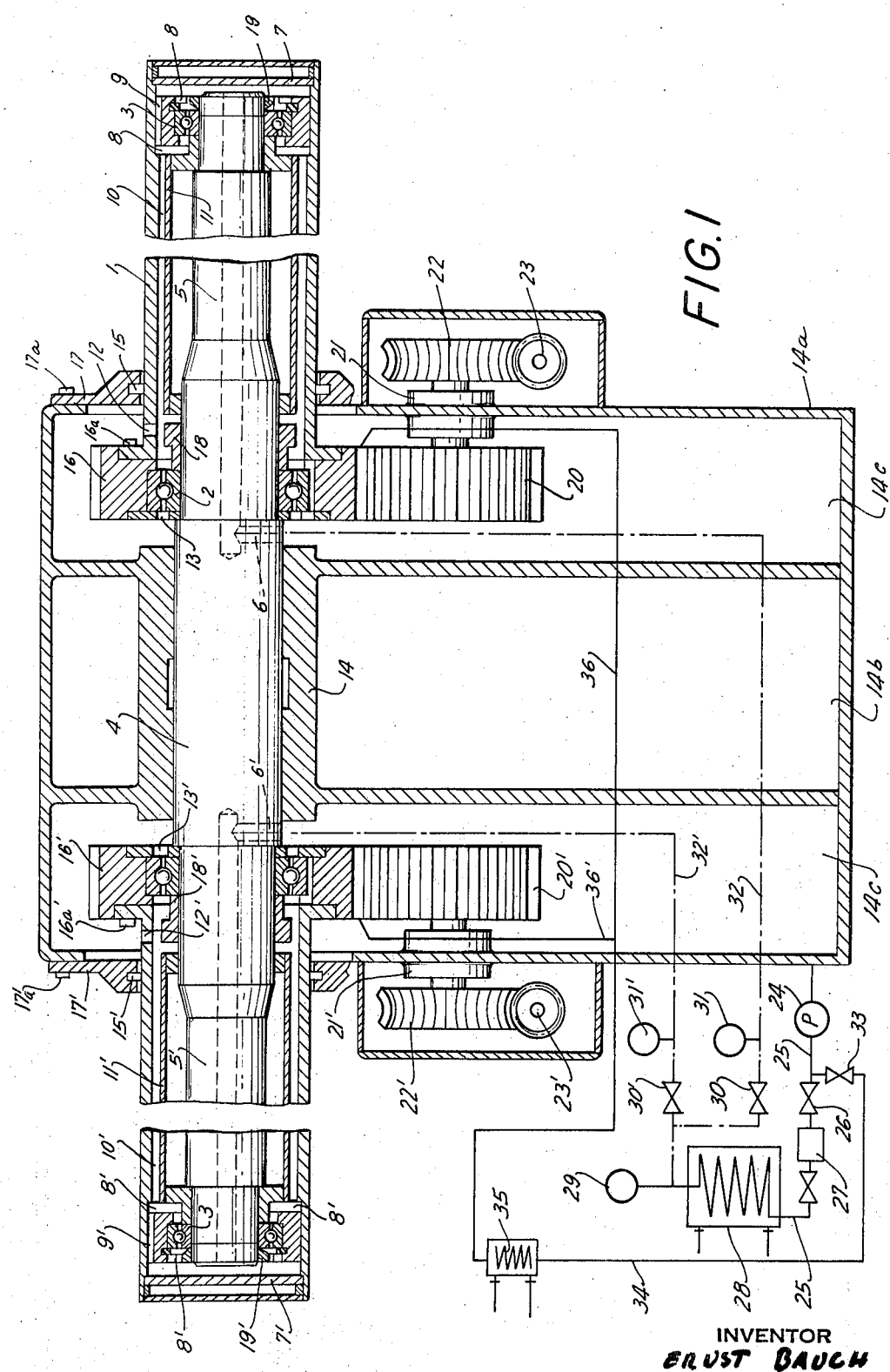
FIG. 1 is a somewhat diagrammatic sectional view illustrating an embodiment of the present invention.

Discussing the drawing now in detail, and first FIG. 1 thereof, it is pointed out that here the single stationary shaft is identified with reference numeral 4. Its intermediate portion located between the spaced end portions is stationarily mounted in a machine frame or support which in this embodiment defines an inner chamber 14$b$ and a part 14$a$ of which forms a housing that defines two outer chambers 14$c$ located at opposite sides of the chamber 14$b$. Each of the spaced end portions of the shaft 4 is surrounded by a roller 1 or 1', respectively, which are journalled on these end portions for rotation. The roller 1 is journalled by means of anti-friction bearings 2 and 3, and the roller 1' by means of anti-friction bearings 2' and 3'. The shaft 4 is provided with a pair of axially extending bores or passages 5, 5' extending from the intermediate portion to the respective outer ends of the shaft. In the region of the intermediate portion each of the bores 5 and 5' communicates with a radial inlet port 6 and 6' respectively. A heating and lubricating fluid, for instance mineral oil or the like, is supplied via the ports 6 and 6' into the bores 5 and 5', respectively, so that it can flow to the outer ends of the rollers 1 and 1' which are respectively closed by the end caps 7 and 7'. Within the rollers are provided guide passages 8 and 8' which direct part of the fluid through the bearings 3 and 3' in order to lubricate the latter, whereas the larger part of the fluid is passed by the guide passages 9 and 9', respectively, into the annular gaps 10 and 10' located in the rollers 1 and 1' intermediate the inner circumferential surfaces thereof and the tubular members 11 and 11' which are located respectively within the rollers 1 and 1'. After passing axially through the annular spaces 10 and 10', the fluid then is in part diverted through the respective passages 13 and 13' into and through the bearings 2 and 2' for lubricating purposes, whereas the largest part is again directly caused to flow through the passages 12 and 12' into the chambers 14$c$.

The supply and guidance of the fluid, and the utilization thereof both for heating and lubricating purposes, is in accordance with my aforementioned copending application.

The rollers 1 and 1' are each removably connected with the drive gears 16 and 16', respectively, by means of the respective screws or bolts 16$a$, 16$a'$. These can be released after first releasing screws 17$a$, 17$a'$ which mount the annular supports 17 and 17' which are fixedly secured to the housing of the apparatus and carry the seals 15, 15' which engage the rotating rollers 1 and 1'. After the members 17 and 17' are removed the screws 16$a$, 16$a'$ can be loosened and after thereupon the end caps 7 and 7' are removed and the mounts 19 and 19' of the bearings 3 and 3', the rollers 1 and 1' can be withdrawn axially from the shaft 4 for inspection, repair or replacement. In so doing the gears 16 and 16' remain in their illustrated position. It is, however, possible to remove the gears 16 and 16' also, by first removing the mounts 18 and 18' for the bearings 2 and 2', and if necessary also removing the tubular members 11 and 11'; thereupon the gears 16 and 16' can also be withdrawn axially from the shaft 4.

The fluid supplied to the rollers 1 and 1' and, as already pointed out above, the chambers 14$c$ after passing through the rollers for heating and lubricating the same. From the chambers 14$c$ it is withdrawn by the pump 24 and passed via the filter 27 to a suitable heating device 28. The reheated fluid—usually oil—is then supplied via the valves 30 and 30' and the conduits 32 and 32' to the inlet ports 6 and 6'. Pressure indicators 29, 31 and 31' permit adjustment and supervision of the appropriate distribution of the fluid to the two rollers 1 and 1'.

The gears 16 and 16' cooperate with drive gears 20, 20', respectively, and of course where these gears mesh there is maximum stress and consequently maximum need for lubrication. In order to provide such appropriate lubrication I provide valves 26 and 33 in the pressure conduit of the pump 24, in order to permit diverting of a quantity of the fluid which is withdrawn from the chambers 14$c$. This quantity is supplied via conduit 34 to a cooling device 35, for instance a known oil cooler, in which it is cooled to be supplied via conduits 36 and 36' to the mesh of the gears 16 and 20, and 16' and 20', respectively. This cooled fluid has a better lubricating effect than the heated fluid which is adequate for lubricating the less stressed bearings 2 and 3, and 2' and 3', respectively.

In the embodiment of FIG. 1 the drives for the rollers 1 and 1' are located outside the actual machine support 14, that is outside the inner chamber 14$b$ thereof. As already pointed out, these drives utilize gears 20 and 20' each of which is mounted on the same shaft as the worm drives 22 and 22' which respectively cam with the gears 20 and 20'; these shafts pass through the housing or support 14 via glands 21 and 21' which are provided for sealing purposes. The drives 22 and 22' are driven by shafts 23 and 23' on which the worm gears of the respective drives are mounted, and with this construction each roller 1 or 1' can be driven independently of the other, at a different or at the same speed as desired.

Figure 2:
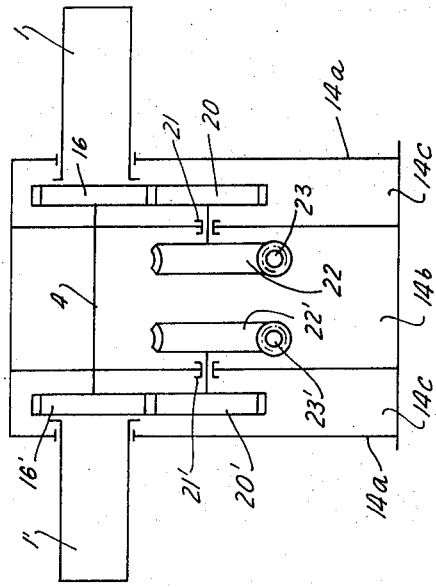
FIG. 2 is a schematic rendering of an apparatus similar to that of FIG. 1, but illustrating a further embodiment of the invention.

Coming to the embodiment of FIG. 2 it will be seen that this is largely the same as in FIG. 1. In fact, like reference numerals designate like elements. The difference here is that the drive shafts 23 and 23' and the worm drives 22 and 22' for the rollers 1 and 1' are located not in the outer chambers 14c but in the inner chamber 14b. In all other respects the embodiment of FIG. 2 is the same as that of FIG. 1.

Figure 3:
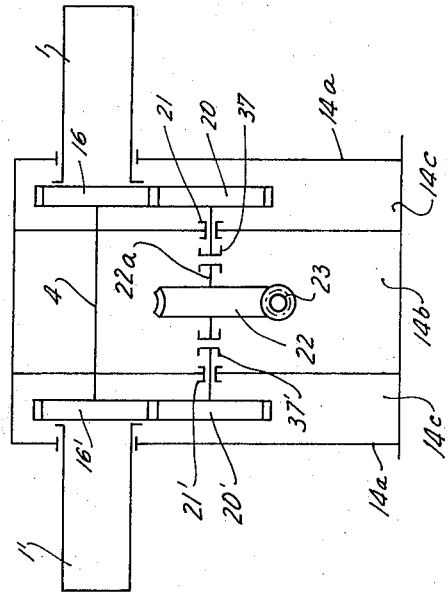
FIG. 3 is a view similar to FIG. 2 and illustrating an additional embodiment of the invention.

In FIG. 3 I have shown still a further embodiment in which a single worm drive 22 is provided, driving both of the rollers 1 and 1'. It has a shaft 22a on which both of the gears 20 and 20' for cooperation with the gears 16 and 16' of the rollers 1 and 1' are mounted, and of course a single shaft 23 (carrying the worm gear of the single drive 22) is provided and driven, as in all of the embodiments, in suitable manner well known to those skilled in the art. It goes without saying from an inspection of FIG. 3 that the drive is located in the inner chamber 14b whereas the shaft 22a passes via glands 21 into the chambers 14c and therein carries the gears 20, 20', respectively.

Figure 4:
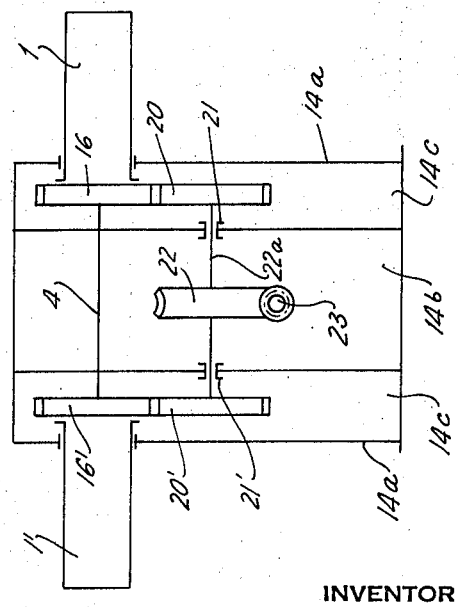
FIG. 4 is a view similar to FIG. 3 but illustrating still a further embodiment of the invention.

Coming, finally, to the embodiment illustrated in FIG. 4, it will be seen that this is analogous to that of FIG. 3. Here, however, the shaft 22a does not directly extend through glands or stuffing boxes in from the chamber 14b into the chambers 14c. Instead, the shaft 22a is subdivided into three sections, one of which is associated with the drive 22 and two other sections of which extend through the glands 21, 21' from the chamber 14b into the chambers 14c where they each carry one of the gears 20, 20'.

There is provided a pair of suitable couplings or clutches 37, 37' by means of which the section of the shaft 22a which is associated with the drive 22 can be connected with the outer sections carrying the gears 20, 20', respectively. This means that the drive 22 can be coupled either with the gear 20 driving the roll 1, with the gear 20' driving the roll 1', or with both of them. The couplings are known per se and may but need not be of the electromagnetically operated type.

It will be understood that each of the elements described above, or two or more together, may also find a useful application in other types of constructions differing from the types described above.

While the invention has been illustrated and described as embodied in an apparatus for stretching of extensible materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims;

1. In an apparatus for stretching extensible materials, wherein a single stationary shaft has an intermediate portion and spaced free end portions which extend outwardly beyond a housing and on each of which a hollow heated stretching roll is journalled separately for rotation, the improvement comprising shaft mounting means located in said housing and engaging only said intermediate portion of said shaft for mounting the same without obstructing said rolls; and drive means in said housing and operative for selectively driving each of said rolls in rotation.

2. An apparatus as defined in claim 1; further comprising heating means for heating each of said rolls.

3. An apparatus as defined in claim 1; further comprising heating means for circulating heated fluid through the respective rolls so as to heat the same.

4. An apparatus as defined in claim 3, said fluid having lubricating properties; and wherein said heating means includes guide means for guiding at least some of said fluid into lubricating contact with said journal means.

5. An apparatus as defined in claim 3, said fluid having lubricating properties; and wherein said heating means includes guide means for guiding some of said fluid into lubricating contact with said journal means, and bypass means for diverting the remainder of said fluid so as to bypass said journal means.

6. An apparatus as defined in claim 3, said mounting means including a mounting frame within said housing.

7. An apparatus as defined in claim 6, said drive means being at least in part located within the confines of said mounting frame.

8. An apparatus as defined in claim 6, said housing having a chamber, and said rolls each having a fluid space provided with an inlet communicating with said heating means and an outlet communicating with said chamber, respectively; and wherein said heating means includes conduit means connecting said chamber with the respective inlets.

9. An apparatus as defined in claim 1; further comprising coupling means for selectively coupling said rolls with and uncoupling them from said drive means.

10. In an apparatus for stretching extensible materials, wherein a single stationary shaft has an intermediate portion and spaced end portions which extend outwardly beyond said housing and on each of which a hollow heater stretching roll is separately journalled for rotation, the improvement comprising shaft mounting means located in said housing and engaging only said intermediate portion of said shaft for mounting the same without obstructing said rolls; and drive means at least in part located in said housing outside said shaft mounting means and operative for selectively driving each of said rolls in rotation.

* * * * *